United States Patent
Ferguson et al.

(10) Patent No.: US 9,224,053 B1
(45) Date of Patent: Dec. 29, 2015

(54) COMBINING MULTIPLE ESTIMATES OF AN ENVIRONMENT INTO A CONSOLIDATED ESTIMATE FOR AN AUTONOMOUS VEHICLE

(71) Applicant: Google Inc., Mountain View, CA (US)

(72) Inventors: David Ian Franklin Ferguson, San Francisco, CA (US); David Harrison Silver, Santa Clara, CA (US)

(73) Assignee: Google Inc., Mountain View, CA (US)

( * ) Notice: Subject to any disclaimer, the term of this patent is extended or adjusted under 35 U.S.C. 154(b) by 153 days.

(21) Appl. No.: 13/955,970

(22) Filed: Jul. 31, 2013

(51) Int. Cl.
*G06K 9/00* (2006.01)

(52) U.S. Cl.
CPC .................................. *G06K 9/00798* (2013.01)

(58) Field of Classification Search
None
See application file for complete search history.

(56) References Cited

U.S. PATENT DOCUMENTS

| | | | |
|---|---|---|---|
| 5,979,581 A * | 11/1999 | Ravani ....................... | B60T 7/16 180/168 |
| 6,278,918 B1 * | 8/2001 | Dickson et al. ................. | 701/23 |
| 6,292,752 B1 | 9/2001 | Franke et al. | |
| 7,307,545 B2 * | 12/2007 | Nishida .............. | G06K 9/00798 340/435 |
| 7,965,870 B2 * | 6/2011 | Kobayashi ......... | G60K 9/00798 348/148 |
| 8,170,285 B2 * | 5/2012 | Nakamori .......... | G06K 9/00798 348/118 |
| 8,428,843 B2 | 4/2013 | Lee et al. | |
| 2010/0079590 A1 * | 4/2010 | Kuehnle ............. | G60K 9/00798 348/118 |
| 2011/0184605 A1 * | 7/2011 | Neff ..................... | G05D 1/0255 701/25 |
| 2012/0070088 A1 * | 3/2012 | Yoshimi ............... | G06T 7/0042 382/199 |
| 2012/0150437 A1 * | 6/2012 | Zeng ..................... | B60W 30/12 701/456 |
| 2012/0221168 A1 | 8/2012 | Zeng et al. | |
| 2012/0296539 A1 | 11/2012 | Cooprider et al. | |
| 2012/0314070 A1 * | 12/2012 | Zhang .................. | B60W 40/00 348/148 |
| 2013/0266175 A1 * | 10/2013 | Zhang .................. | G06T 7/0083 382/103 |

* cited by examiner

*Primary Examiner* — Matthew Bella
*Assistant Examiner* — Soo Shin
(74) *Attorney, Agent, or Firm* — McDonnell Boehnen Hulbert & Berghoff LLP

(57) ABSTRACT

A vehicle is provided that may combine multiple estimates of an environment into a consolidated estimate. The vehicle may receive first data indicative of the region of interest in an environment from a sensor of the vehicle. The first data may include a first accuracy value and a first estimate of the region of interest. The vehicle may also receive second data indicative of the region of interest in the environment, and the second data may include a second accuracy value and a second estimate of the region of interest. Based on the first data and the second data, the vehicle may combine the first estimate of the region of interest and the second estimate of the region of interest.

17 Claims, 5 Drawing Sheets

COMBINING MULTIPLE ESTIMATES OF AN ENVIRONMENT INTO A CONSOLIDATED ESTIMATE FOR AN AUTONOMOUS VEHICLE

BACKGROUND

Unless otherwise indicated herein, the materials described in this section are not prior art to the claims in this application and are not admitted to be prior art by inclusion in this section.

Vehicles can be configured to operate in an autonomous mode in which the vehicle navigates through an environment with little or no input from a driver. Such autonomous vehicles can include one or more sensors that are configured to detect information about the environment in which the vehicle operates. The vehicle and its associated computer-implemented controller use the detected information to navigate through the environment. For example, if the sensor(s) detect that the vehicle is approaching an obstacle, as determined by the computer-implemented controller, the controller adjusts the directional controls of the vehicle to cause the vehicle to navigate around the obstacle.

SUMMARY

Within examples, methods and systems are disclosed for combining multiple estimates of an environment into a consolidated estimate for an autonomous vehicle.

In a first aspect, a method is provided. The method may include receiving, using a processor, first data indicative of a region of interest in an environment from at least one sensor of a vehicle. The first data may include a first accuracy value and a first estimate of the region of interest, and the first accuracy value may be representative of how accurately the first estimate of the region of interest estimates the region of interest. The vehicle may be configured to operate in an autonomous mode in the environment, and the vehicle may be substantially in the region of interest in the environment. The method may also include receiving second data indicative of the region of interest in the environment. The second data may include a second accuracy value and a second estimate of the region of interest; the second accuracy value may be representative of how accurately the second estimate of the region of interest represents the region of interest; and the second data may be different than the first data. The method may additionally include based on the first estimate of the region of interest, the first accuracy value, the second estimate of the region of interest, and the second accuracy value, combining the first estimate of the region of interest and the second estimate of the region of interest to determine a combined estimate of the region of interest. The combined estimate of the region of interest may include a third accuracy value that may be representative of how accurately the combined estimate of the region of interest represents the region of interest.

In a second aspect, a vehicle is provided. The vehicle may include a sensor configured to sense a region of interest in an environment of the vehicle; the vehicle may be configured to operate in an autonomous mode in the environment; and the vehicle may be substantially in the region of interest in the environment. The vehicle may also include a computer system. The computer system may be configured to receive first data indicative of a region of interest in an environment from the sensor. The first data may include a first accuracy value and a first estimate of the region of interest, and the first accuracy value may be representative of how accurately the first estimate of the region of interest estimates the region of interest. The computer system may also be configured to receive second data indicative of the region of interest in the environment. The second data may include a second accuracy value and a second estimate of the region of interest. The second accuracy value may be representative of how accurately the second estimate of the region of interest represents the region of interest. The second data may be different than the first data. The computer system may additionally be configured to based on the first estimate of the region of interest, the first accuracy value, the second estimate of the region of interest, and the second accuracy value, combine the first estimate of the region of interest and the second estimate of the region of interest to determine a combined estimate of the region of interest. The combined estimate of the region of interest may include a third accuracy value that is representative of how accurately the combined estimate of the region of interest represents the region of interest.

In a third aspect, a non-transitory computer readable medium having stored therein instructions that when executed by a computer system in a vehicle, cause the computer system to perform functions is disclosed. The functions may include receiving, using a processor, first data indicative of a region of interest in an environment from at least one sensor of the vehicle. The first data may include a first accuracy value and a first estimate of the region of interest, and the first accuracy value may be representative of how accurately the first estimate of the region of interest estimates the region of interest. The vehicle may be configured to operate in an autonomous mode in the environment, and the vehicle may be substantially in the region of interest in the environment. The functions may also include receiving second data indicative of the region of interest in the environment. The second data may include a second accuracy value and a second estimate of the region of interest, and the second accuracy value may be representative of how accurately the second estimate of the region of interest represents the region of interest. The second data may be different than the first data. The functions may additionally include based on the first estimate of the region of interest, the first accuracy value, the second estimate of the region of interest, and the second accuracy value, combining the first estimate of the region of interest and the second estimate of the region of interest to determine a combined estimate of the region of interest. The combined estimate of the region of interest may include a third accuracy value that may be representative of how accurately the combined estimate of the region of interest represents the region of interest.

In a fourth aspect a system is disclosed. The system may include a means for receiving first data indicative of a region of interest in an environment from at least one sensor of a vehicle. The first data may include a first accuracy value and a first estimate of the region of interest, and the first accuracy value may be representative of how accurately the first estimate of the region of interest estimates the region of interest. The vehicle may be configured to operate in an autonomous mode in the environment, and the vehicle may be substantially in the region of interest in the environment. The system may also include a means for receiving second data indicative of the region of interest in the environment. The second data may include a second accuracy value and a second estimate of the region of interest, and the second accuracy value may be representative of how accurately the second estimate of the region of interest represents the region of interest. The second data may be different than the first data. The method may additionally include a means for based on the first estimate of the region of interest, the first accuracy value, the second estimate of the region of interest, and the second accuracy value, combining the first estimate of the region of interest and the second estimate of the region of interest to determine a combined estimate of the region of interest. The combined estimate of the region of interest may include a third accuracy value that may be representative of how accurately the combined estimate of the region of interest represents the region of interest.

The foregoing summary is illustrative only and is not intended to be in any way limiting. In addition to the illustrative aspects, embodiments, and features described above, further aspects, embodiments, and features will become apparent by reference to the figures and the following detailed description.

DETAILED DESCRIPTION

Figure 1:
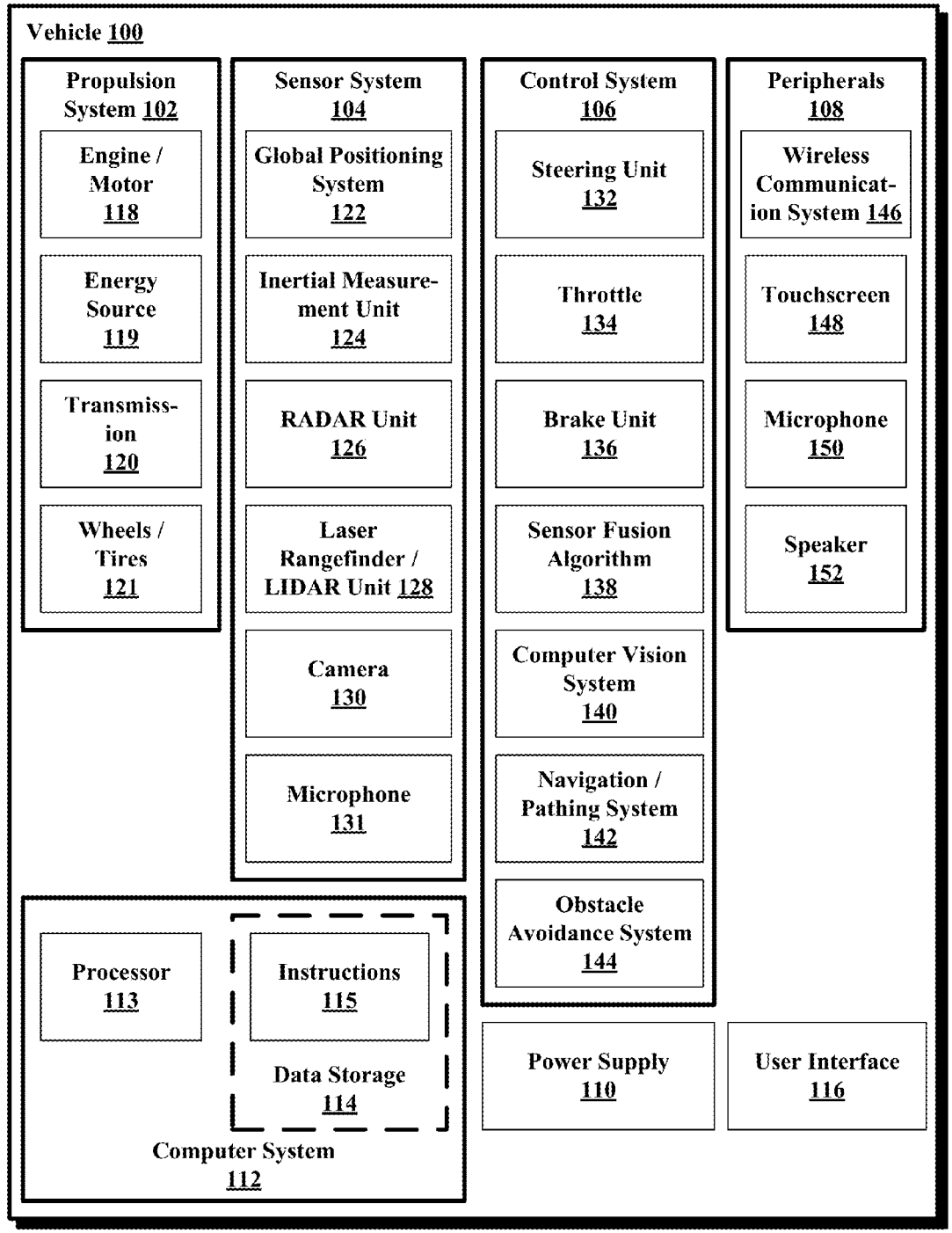
FIG. 1 illustrates a functional block diagram illustrating a vehicle, in accordance with an example embodiment.

Example methods and systems are described herein. Any example embodiment or feature described herein is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the Figures should not be viewed as limiting. It should be understood that other embodiments may include more or less of each element shown in a given Figure. Further, some of the illustrated elements may be combined or omitted. Yet further, an example embodiment may include elements that are not illustrated in the Figures.

For vehicles operating in an autonomous mode, sensing and detecting the markers that specify the boundaries of different traffic lanes may be important. Additionally, recognizing the presence of objects in a current lane of the vehicle may also be important. Various sources of information may be used to help determine where a current lane of travel of the autonomous vehicle is and the presence of any objects that may be within the lane of travel. Such information may include, for example, the use of known road maps, detected lane markers/reflectors, information indicative of other vehicle driving patterns, and the known presence of obstacles (e.g., K-rails, cones, etc.) that may be in the environment of the vehicle. Ideally, any of these information sources may be used to determine an accurate estimate of the lane of travel of the vehicle and thereby determine an estimate of where the vehicle may safely travel and/or operate. However, making such a determination in a robust manner may be computationally expensive and difficult.

Disclosed herein are methods and systems that may allow an autonomous vehicle to incorporate various different lane estimates into one consolidated lane estimate and associate with the consolidated lane estimate a representation of confidence of the estimate. Disclosed embodiments relate to an autonomous vehicle that may be configured to receive first data indicative of a lane of travel in an environment the vehicle is operating in from a sensor of the vehicle. The vehicle may also be configured to receive second data (e.g., from a second sensor, a map, or at a later time) indicative of the lane of travel in the environment. The first data and the second data may each include accuracy values that define how accurately the respective data defines the lane of travel. Based on the first and second data and the respective accuracy values, the vehicle may combine the first and second data in attempt to more robustly and accurately estimate the lane of travel. The vehicle may also determine an accuracy value that represents how confident the combined lane estimate is.

Example systems will now be described in greater detail. Generally, an example system may be implemented in or may take the form of a computing device. However, an example system may also be implemented in or take the form of other devices or may be included within vehicles, such as cars, trucks, motorcycles, buses, boats, airplanes, helicopters, lawn mowers, recreational vehicles, amusement park vehicles, farm equipment, construction equipment, trams, golf carts, trains, and trolleys. Other vehicles are possible as well.

FIG. 1 is a functional block diagram depicting a vehicle 100 according to an example embodiment. The vehicle 100 is configured to operate fully or partially in an autonomous mode, and thus may be referred to as an "autonomous vehicle." For example, a computer system 112 may control the vehicle 100 while in an autonomous mode via control instructions to a control system 106 for the vehicle 100. The computer system 112 may receive information from a sensor system 104, and base one or more control processes (such as the setting a heading so as to avoid a detected obstacle) upon the received information in an automated fashion.

The vehicle 100 may be fully autonomous or partially autonomous. In a partially autonomous vehicle some functions can optionally be manually controlled (e.g., by a driver) some or all of the time. Further, a partially autonomous vehicle may be configured to switch between a fully-manual operation mode and a partially-autonomous and/or a fully-autonomous operation mode.

The vehicle 100 may include various subsystems such as a propulsion system 102, a sensor system 104, a control system 106, one or more peripherals 108, as well as a power supply 110, a computer system 112, and a user interface 116. The vehicle 100 may include more or fewer subsystems and each subsystem may include multiple elements. Further, each of the subsystems and elements of vehicle 100 may be interconnected. Thus, one or more of the described functions of the vehicle 100 may be divided up into additional functional or physical components, or combined into fewer functional or physical components. In some further examples, additional functional and/or physical components may be added to the examples illustrated by FIG. 1.

The propulsion system 102 may include components operable to provide powered motion to the vehicle 100. Depending upon the embodiment, the propulsion system 102 may include an engine/motor 118, an energy source 119, a transmission 120, and wheels/tires 121. The engine/motor 118 could be any combination of an internal combustion engine, an electric motor, steam engine, Stirling engine, or other types of engines and/or motors. In some embodiments, the propulsion system 102 may include multiple types of engines and/or motors. For instance, a gas-electric hybrid vehicle may include a gasoline engine and an electric motor. Other examples are possible as well.

The energy source 119 may represent a source of energy that may, in full or in part, power the engine/motor 118. That is, the engine/motor 118 may be configured to convert the energy source 119 into mechanical energy to operate the transmission 120. Examples of energy sources 119 may include gasoline, diesel, other petroleum-based fuels, propane, other compressed gas-based fuels, ethanol, solar panels, batteries, capacitors, flywheels, regenerative braking systems, and/or other sources of electrical power, etc. The energy source 119 may also provide energy for other systems of the automobile 100.

The transmission 120 may include elements that are operable to transmit mechanical power from the engine/motor 118 to the wheels/tires 121. Such elements may include a gearbox, a clutch, a differential, a drive shaft, and/or axle(s), etc. The transmission 120 may include other elements as well. The drive shafts may include one or more axles that may be coupled to the one or more wheels/tires 121.

The wheels/tires 121 may be arranged to stably support the vehicle 100 while providing frictional traction with a surface, such as a road, upon which the vehicle 100 moves. Accordingly, the wheels/tires 121 of vehicle 100 may be configured in various formats, including a unicycle, bicycle/motorcycle, tricycle, or car/truck four-wheel format. Other wheel/tire geometries are possible, such as those including six or more wheels. Any combination of the wheels/tires 121 of vehicle 100 may be operable to rotate differentially with respect to other wheels/tires 121. The wheels/tires 121 may represent at least one wheel that is fixedly attached to the transmission 120 and at least one tire coupled to a rim of the wheel that could make contact with the driving surface. The wheels/tires 121 may include any combination of metal and rubber, or another combination of materials.

The sensor system 104 generally includes one or more sensors configured to detect information about the environment surrounding the vehicle 100. For example, the sensor system 104 may include a Global Positioning System (GPS) 122, an inertial measurement unit (IMU) 124, a RADAR unit 126, a laser rangefinder/LIDAR unit 128, a camera 130, and/or a microphone 131. The sensor system 104 may also include sensors configured to monitor internal systems of the vehicle 100 (e.g., $O_2$ monitor, fuel gauge, engine oil temperature, wheel speed sensors, etc.). One or more of the sensors included in the sensor system 104 may be configured to be actuated separately and/or collectively in order to modify a position and/or an orientation of the one or more sensors.

The GPS 122 may be any sensor configured to estimate a geographic location of the vehicle 100. To this end, GPS 122 may include a transceiver operable to provide information regarding the position of the vehicle 100 with respect to the Earth.

The IMU 124 may include any combination of sensors (e.g., accelerometers and gyroscopes) configured to sense position and orientation changes of the vehicle 100 based on inertial acceleration.

The RADAR unit 126 may represent a system that utilizes radio signals to sense objects within the local environment of the vehicle 100. In some embodiments, in addition to sensing the objects, the RADAR unit 126 may additionally be configured to sense the speed and/or heading of the objects.

Similarly, the laser rangefinder or LIDAR unit 128 may be any sensor configured to sense objects in the environment in which the vehicle 100 is located using lasers. Depending upon the embodiment, the laser rangefinder/LIDAR unit 128 could include one or more laser sources, a laser scanner, and one or more detectors, among other system components. The laser rangefinder/LIDAR unit 128 could be configured to operate in a coherent (e.g., using heterodyne detection) or an incoherent detection mode.

The camera 130 may include one or more devices configured to capture a plurality of images of the environment surrounding the vehicle 100. The camera 130 may be a still camera or a video camera. In some embodiments, the camera 130 may be mechanically movable such as by rotating and/or tilting a platform to which the camera is mounted. As such, a control process of the vehicle 100 may be implemented to control the movement of the camera 130.

The sensor system 104 may also include a microphone 131. The microphone 131 may be configured to capture sound from the environment surrounding the vehicle 100. In some cases, multiple microphones can be arranged as a microphone array, or possibly as multiple microphone arrays.

The control system 106 may be configured to control operation(s) of the vehicle 100 and its components. Accordingly, the control system 106 may include various elements include steering unit 132, throttle 134, brake unit 136, a sensor fusion algorithm 138, a computer vision system 140, a navigation/pathing system 142, and an obstacle avoidance system 144, etc.

The steering unit 132 may represent any combination of mechanisms that may be operable to adjust the heading of vehicle 100. For example, the steering unit 132 can adjust the axis (or axes) of one or more of the wheels/tires 121 so as to effect turning of the vehicle 100. The throttle 134 may be configured to control, for instance, the operating speed of the engine/motor 118 and, in turn, control the speed of the vehicle 100. The brake unit 136 may include any combination of mechanisms configured to decelerate the vehicle 100. The brake unit 136 may, for example, use friction to slow the wheels/tires 121. In other embodiments, the brake unit 136 inductively decelerates the wheels/tires 121 by a regenerative braking process to convert kinetic energy of the wheels/tires 121 to electric current. The brake unit 136 may take other forms as well.

The sensor fusion algorithm 138 may be an algorithm (or a computer program product storing an algorithm) configured to accept data from the sensor system 104 as an input. The data may include, for example, data representing information sensed at the sensors of the sensor system 104. The sensor fusion algorithm 138 may include, for instance, a Kalman filter, Bayesian network, or other algorithm. The sensor fusion algorithm 138 may provide various assessments based on the data from sensor system 104. Depending upon the embodiment, the assessments may include evaluations of individual objects and/or features in the environment of vehicle 100, evaluations of particular situations, and/or evaluations of possible impacts based on the particular situation. Other assessments are possible.

The computer vision system 140 may be any system operable to process and analyze images captured by camera 130 in order to identify objects and/or features in the environment of vehicle 100 that could include traffic signals, road way boundaries, other vehicles, pedestrians, and/or obstacles, etc. The computer vision system 140 may use an object recognition algorithm, a Structure From Motion (SFM) algorithm, video tracking, and other computer vision techniques. In some embodiments, the computer vision system 140 could be additionally configured to map an environment, track objects, estimate the speed of objects, etc.

The navigation and pathing system 142 may be any system configured to determine a driving path for the vehicle 100. For example, the navigation/pathing system 142 may determine a series of speeds and directional headings to effect movement of the vehicle 100 along a path that substantially avoids perceived obstacles while generally advancing the vehicle 100 along a roadway-based path leading to an ultimate destination, which may be set according to user inputs via the user interface 116, for example. The navigation and pathing system 142 may additionally be configured to update the driving path dynamically while the vehicle 100 is in operation. In some embodiments, the navigation and pathing system 142 could be configured to incorporate data from the sensor fusion algorithm 138, the GPS 122, and one or more predetermined maps so as to determine the driving path for vehicle 100.

The obstacle avoidance system 144 may represent a control system configured to identify, evaluate, and avoid or otherwise negotiate potential obstacles in the environment of the vehicle 100. For example, the obstacle avoidance system 144 may effect changes in the navigation of the vehicle 100 by operating one or more subsystems in the control system 106 to undertake swerving maneuvers, turning maneuvers, braking maneuvers, etc. In some embodiments, the obstacle avoidance system 144 is configured to automatically determine feasible ("available") obstacle avoidance maneuvers on the basis of surrounding traffic patterns, road conditions, etc. For example, the obstacle avoidance system 144 may be configured such that a swerving maneuver is not undertaken when other sensor systems detect vehicles, construction barriers, other obstacles, etc. in the region adjacent the vehicle 100 that would be swerved into. In some embodiments, the obstacle avoidance system 144 may automatically select the maneuver that is both available and maximizes safety of occupants of the vehicle. For example, the obstacle avoidance system 144 may select an avoidance maneuver predicted to cause the least amount of acceleration in a passenger cabin of the vehicle 100.

The control system 106 may additionally or alternatively include components other than those shown and described.

The vehicle 100 also includes peripherals 108 configured to allow interaction between the vehicle 100 and external sensors, other vehicles, other computer systems, and/or a user, such as an occupant of the vehicle 100. For example, the peripherals 108 for receiving information from occupants, external systems, etc. may include a wireless communication system 146, a touchscreen 148, a microphone 150, and/or a speaker 152.

In some embodiments, the peripherals 108 function to receive inputs for a user of the vehicle 100 to interact with the user interface 116. To this end, the touchscreen 148 can both provide information to a user of the vehicle 100, and convey information from the user indicated via the touchscreen 148 to the user interface 116. The touchscreen 148 can be configured to sense both touch positions and touch gestures from the finger of a user (or stylus, etc.) via capacitive sensing, resistance sensing, optical sensing, a surface acoustic wave process, etc. The touchscreen 148 can be capable of sensing finger movement in a direction parallel or planar to the touchscreen surface, in a direction normal to the touchscreen surface, or both, and may also be capable of sensing a level of pressure applied to the touchscreen surface. An occupant of the vehicle 100 can also utilize a voice command interface. For example, the microphone 150 can be configured to receive audio (e.g., a voice command or other audio input) from an occupant of the vehicle 100. Similarly, the speaker 152 can be configured to output audio to the occupant of the vehicle 100.

In some embodiments, the peripherals 108 function to allow communication between the vehicle 100 and external systems, such as devices, sensors, other vehicles, etc. within its surrounding environment and/or controllers, servers, etc., physically located far from the vehicle 100 that provide useful information regarding the vehicle's surroundings, such as traffic information, weather information, etc. For example, the wireless communication system 146 can wirelessly communicate with one or more devices directly or via a communication network. The wireless communication system 146 can optionally use 3G cellular communication, such as CDMA, EVDO, GSM/GPRS, and/or 4G cellular communication, such as WiMAX or LTE. Additionally or alternatively, the wireless communication system 146 can communicate with a wireless local area network (WLAN), for example, using WiFi. In some embodiments, the wireless communication system 146 could communicate directly with a device, for example, using an infrared link, Bluetooth, and/or ZigBee. The wireless communication system 146 can include one or more dedicated short range communication (DSRC) devices that can include public and/or private data communications between vehicles and/or roadside stations. Other wireless protocols for sending and receiving information embedded in signals, such as various vehicular communication systems, can also be employed by the wireless communication system 146 within the context of the present disclosure.

The power supply 110 may provide power to components of the vehicle 100, such as electronics in the peripherals 108, the computer system 112, the sensor system 104, etc. The power supply 110 can include a rechargeable lithium-ion or lead-acid battery for storing and discharging electrical energy to the various powered components, for example. In some embodiments, one or more banks of batteries may be configured to provide electrical power. In some embodiments, the power supply 110 and the energy source 119 can be implemented together, as in some all-electric cars.

Many or all of the functions of the vehicle 100 may be controlled via the computer system 112 that receives inputs from the sensor system 104, the peripherals 108, etc., and communicates appropriate control signals to the propulsion system 102, the control system 106, the peripherals 108, etc. to effect automatic operation of the vehicle 100 based on its surroundings. The computer system 112 may include at least one processor 113 (which could include at least one microprocessor) that executes instructions 115 stored in a non-transitory computer readable medium, such as the data storage 114. The computer system 112 may also represent a plurality of computing devices that may serve to control individual components or subsystems of the vehicle 100 in a distributed fashion.

In some embodiments, data storage 114 may contain instructions 115 (e.g., program logic) executable by the processor 113 to execute various automobile functions, including those described above in connection with FIG. 1. Data storage 114 may contain additional instructions as well, including instructions to transmit data to, receive data from, interact with, and/or control one or more of the propulsion system 102, the sensor system 104, the control system 106, and the peripherals 108.

In addition to the instructions 115, the data storage 114 may store data such as roadway maps, path information, among other information. Such information may be used by vehicle 100 and computer system 112 at during the operation of the vehicle 100 in the autonomous, semi-autonomous, and/or manual modes.

The vehicle 100, and associated computer system 112, provides information to and/or receives input from, a user of the vehicle 100, such as an occupant in a passenger cabin of the vehicle 100. Accordingly, the vehicle 100 may include a user interface 116 for providing information to or receiving input from a user of vehicle 100. The user interface 116 may control or enable control of content and/or the layout of interactive images that could be displayed on the touchscreen 148. Further, the user interface 116 could include one or more input/output devices within the set of peripherals 108, such as the wireless communication system 146, the touchscreen 148, the microphone 150, and the speaker 152.

The computer system 112 controls the operation of the vehicle 100 based on inputs received from various subsystems indicating vehicle and/or environmental conditions (e.g., propulsion system 102, sensor system 104, and/or control system 106), as well as inputs from the user interface 116, indicating user preferences. For example, the computer system 112 may utilize input from the control system 106 to control the steering unit 132 to avoid an obstacle detected by the sensor system 104 and the obstacle avoidance system 144. The computer system 112 may be configured to control many aspects of the vehicle 100 and its subsystems. Generally, however, provisions are made for manually overriding automated controller-driven operation, such as in the event of an emergency, or merely in response to a user-activated override, etc.

The components of the vehicle 100 described herein may be configured to work in an interconnected fashion with other components within or outside their respective systems. For example, the camera 130 can capture a plurality of images that represent information about an environment of the vehicle 100 while operating in an autonomous mode. The environment may include other vehicles, traffic lights, traffic signs, road markers, pedestrians, etc. The computer vision system 140 can categorize and/or recognize various aspects in the environment in concert with the sensor fusion algorithm 138, the computer system 112, etc. based on object recognition models pre-stored in the data storage 114, and/or by other techniques.

Although FIG. 1 shows various components of vehicle 100, i.e., wireless communication system 146, computer system 112, data storage 114, and user interface 116, as being integrated into the vehicle 100, one or more of these components could be mounted or associated separately from the vehicle 100. For example, data storage 114 could, in part or in full, exist separate from the vehicle 100. Thus, the vehicle 100 could be provided in the form of device elements that may be located separately or together. The device elements that make up vehicle 100 may generally be communicatively coupled together in a wired and/or wireless fashion.

Figure 2:
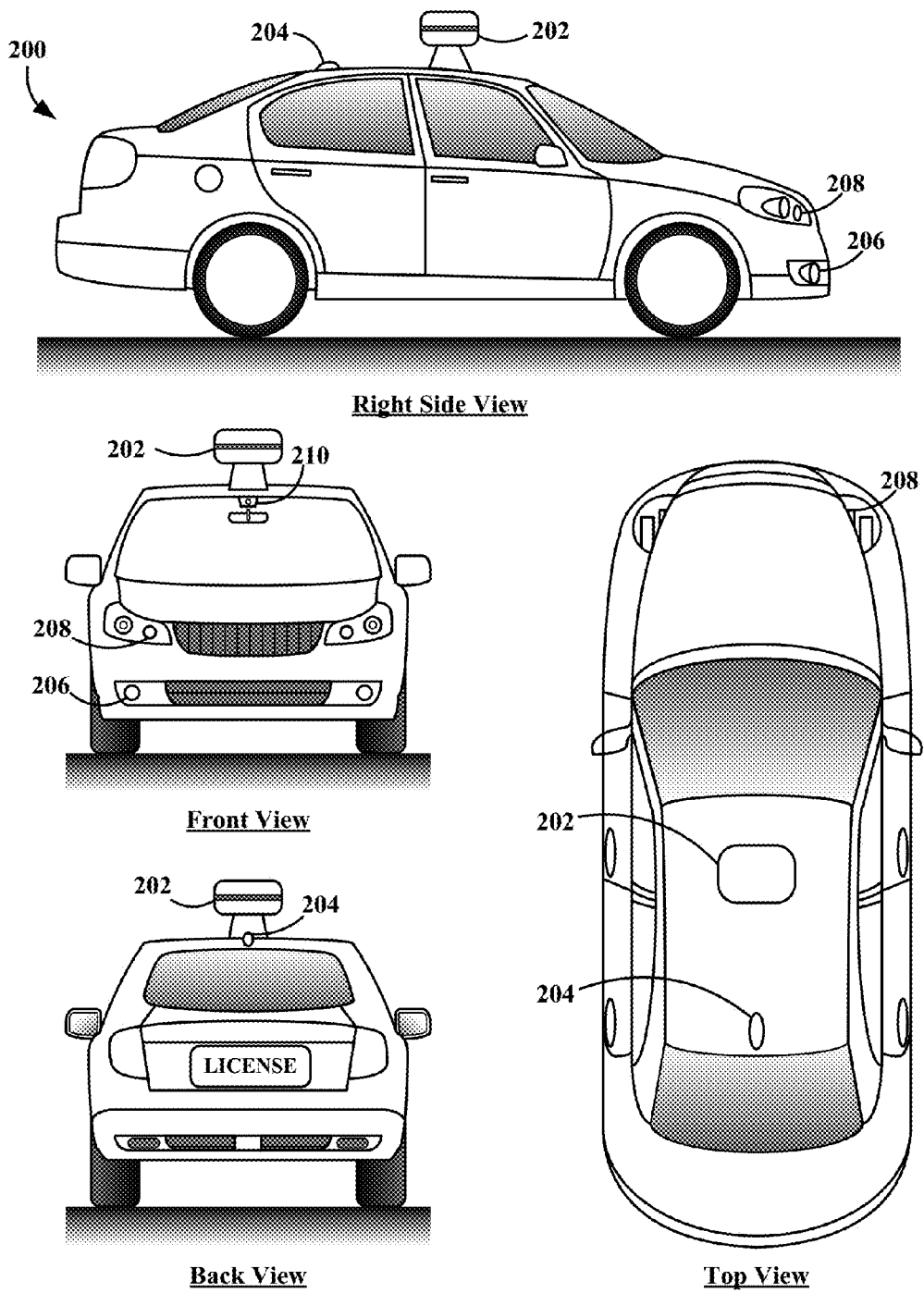
FIG. 2 illustrates a vehicle, in accordance with an example embodiment.

FIG. 2 depicts an example vehicle 200 that can include all or most of the functions described in connection with the vehicle 100 in reference to FIG. 1. Although example vehicle 200 is illustrated in FIG. 2 as a four-wheel sedan-type car for illustrative purposes, the present disclosure is not so limited. For instance, example vehicle 200 can represent any type of vehicle mentioned herein.

Example vehicle 200 includes a sensor unit 202, a wireless communication system 204, a LIDAR unit 206, a laser rangefinder unit 208, and a camera 210. Furthermore, example vehicle 200 may include any of the components described in connection with vehicle 100 of FIG. 1.

The sensor unit 202 is mounted atop example vehicle 200 and includes one or more sensors configured to detect information about an environment surrounding example vehicle 200, and output indications of the information. For example, the sensor unit 202 may include any combination of cameras, RADARs, LIDARs, range finders, and acoustic sensors. The sensor unit 202 may include one or more movable mounts that may be operable to adjust the orientation of one or more sensors in the sensor unit 202. In one embodiment, the movable mount may include a rotating platform that may scan sensors so as to obtain information from each direction around example vehicle 200. In another embodiment, the movable mount of the sensor unit 202 may be moveable in a scanning fashion within a particular range of angles and/or azimuths. The sensor unit 202 may be mounted atop the roof of a car, for instance, however other mounting locations are possible. Additionally, the sensors of the sensor unit 202 may be distributed in different locations and need not be collocated in a single location. Some possible sensor types and mounting locations include the LIDAR unit 206 and laser rangefinder unit 208. Furthermore, each sensor of the sensor unit 202 may be configured to be moved or scanned independently of other sensors of the sensor unit 202.

The wireless communication system 204 may be located on a roof of example vehicle 200 as depicted in FIG. 2. Alternatively, the wireless communication system 204 may be located, fully or in part, elsewhere. The wireless communication system 204 may include wireless transmitters and receivers that may be configured to communicate with devices external or internal to example vehicle 200. Specifically, the wireless communication system 204 may include transceivers configured to communicate with other vehicles and/or computing devices, for instance, in a vehicular communication system or a roadway station. Examples of such vehicular communication systems include dedicated short range communications (DSRC), radio frequency identification (RFID), and other proposed communication standards directed towards intelligent transport systems.

The camera 210 may be a photo-sensitive instrument, such as a still camera, a video camera, etc., that is configured to capture a plurality of images of the environment of example vehicle 200. To this end, the camera 210 can be configured to detect visible light, and can additionally or alternatively be configured to detect light from other portions of the spectrum, such as infrared or ultraviolet light. The camera 210 can be a two-dimensional detector, and can optionally have a three-dimensional spatial range of sensitivity. In some embodiments, the camera 210 can include, for example, a range detector configured to generate a two-dimensional image indicating distance from the camera 210 to a number of points in the environment. To this end, the camera 210 may use one or more range detecting techniques.

For example, the camera 210 may provide range information by using a structured light technique in which example vehicle 200 illuminates an object in the environment with a predetermined light pattern, such as a grid or checkerboard pattern and uses the camera 210 to detect a reflection of the predetermined light pattern from environmental surroundings. Based on distortions in the reflected light pattern, example vehicle 200 may determine the distance to the points on the object. The predetermined light pattern may comprise infrared light, or radiation at other suitable wavelengths for such measurements.

The camera 210 may be mounted inside a front windshield of example vehicle 200. Specifically, the camera 210 may be situated to capture images from a forward-looking view with respect to the orientation of example vehicle 200. Other mounting locations and viewing angles of the camera 210 may also be used, either inside or outside example vehicle 200.

The camera 210 can have associated optics operable to provide an adjustable field of view. Further, the camera 210 may be mounted to example vehicle 200 with a movable mount to vary a pointing angle of the camera 210, such as a via a pan/tilt mechanism.

Figure 3:
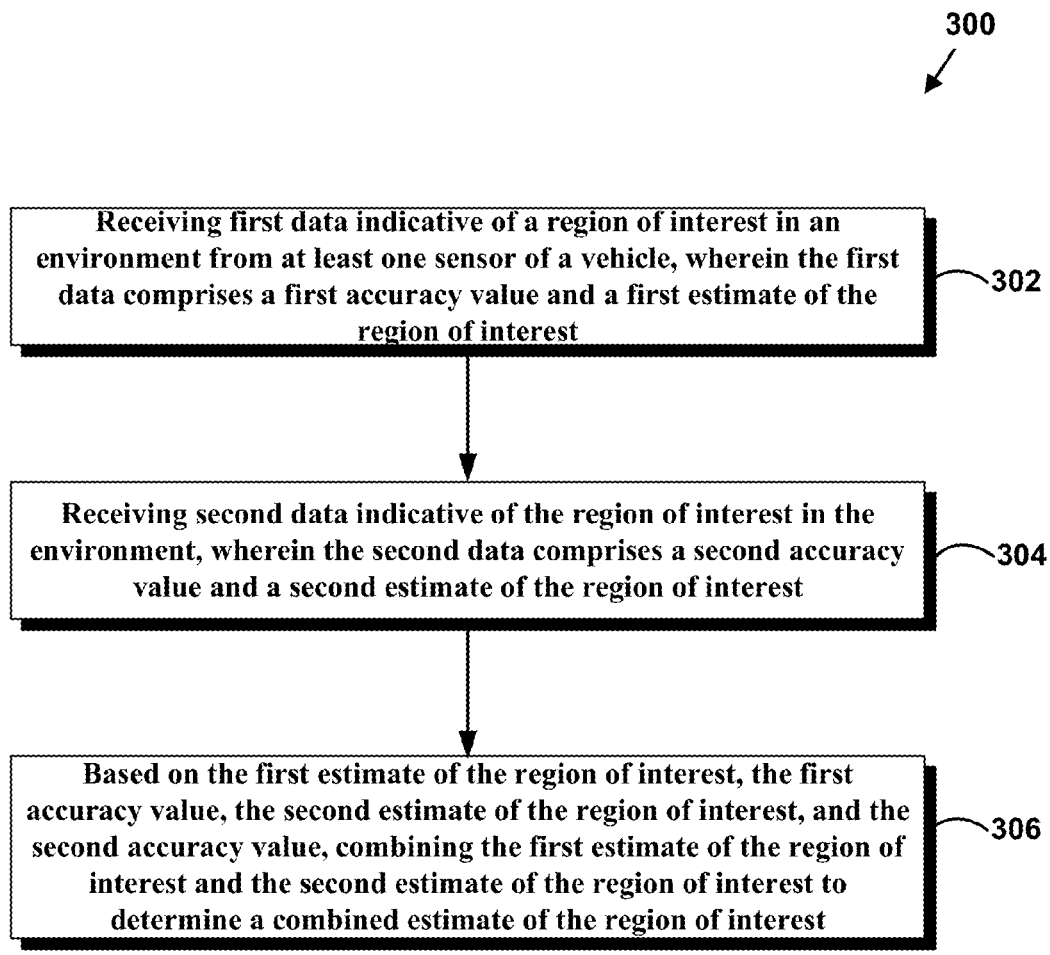
FIG. 3 illustrates a block diagram of a method, in accordance with an example embodiment.

In FIG. 3, a method 300 is provided for combining multiple estimates of an environment into a consolidated estimate, in accordance with an example embodiment. The vehicle described in this method may be vehicle 100 and/or vehicle 200 as illustrated and described in reference to FIGS. 1 and 2, respectively, or components of the vehicle 100 or vehicle 200. For example, the processes described herein may be carried out by RADAR unit 126, LIDAR unit 128, and/or camera 130 mounted to an autonomous vehicle (e.g., vehicle 200) in communication with computer system 112, sensor fusion algorithm 138, and/or computer vision system 140.

Furthermore, it is noted that the functionality described in connection with the flowcharts described herein can be implemented as special-function and/or configured general-function hardware modules, portions of program code executed by a processor (e.g., the processor 113 in the computer system 112) for achieving specific logical functions, determinations, and/or steps described in connection with the flowchart shown in FIG. 3. Where used, program code can be stored on any type of computer-readable medium (e.g., computer-readable storage medium or non-transitory media, such as the data storage 114 described above with respect to computer system 112 and/or a computer program product 500 described below), for example, such as a storage device including a disk or hard drive.

In addition, each block of the flowchart shown in FIG. 3 may represent circuitry that is wired to perform the specific logical functions in the process. Unless specifically indicated, functions in the flowchart shown in FIG. 3 may be executed out of order from that shown or discussed, including substantially concurrent execution of separately described functions, or even in reverse order in some examples, depending on the functionality involved, so long as the overall functionality of the described method is maintained.

Initially at block 302, method 300 of FIG. 3 includes receiving first data indicative of a region of interest in an environment from at least one sensor of a vehicle. The first data may include a first accuracy value and a first estimate of the region of interest. As previously noted, the vehicle may be the vehicle described in reference to FIGS. 1 and 2 may be configured to operate in an autonomous mode in the environment. The environment may be any environment in which the vehicle may be operating autonomously such as the environment described below with reference to FIG. 4. Other environments are possible as well.

The region of interest may be an area of the environment that the vehicle focuses on or desires to focus on. The region of interest may comprise an angular region in front of or behind the vehicle or a lateral area to either side of the vehicle. In other examples, the region of interest may be below the vehicle. For example, the region of interest may represent a portion of a road in the environment including, for example, a highway or an interstate to name a few. In other examples, the region of interest may include a portion of a sidewalk, or a fixture or object located in the environment. In yet further examples, the region of interest may be a lane of travel upon which a vehicle is operating or positioned in in the environment. In examples in which the vehicle is not an automobile, the region of interest may be defined in other mediums of travel including water or air.

The sensor may be coupled to the vehicle in a manner similar to or the same as that discussed with reference to FIG. 2, and may include any of the sensors described above with regard to FIGS. 1 and 2. Other sensors are possible as well and any sensor may be used that is capable of obtaining sensor data indicative of the region of interest in the environment in which the vehicle is operating.

The data (i.e., sensor data) may be any data obtained using one or more of the sensors and may be indicative of (or represent) the region of interest. The data may include an accuracy value and an estimate of the region of interest. The accuracy value may be representative of how accurately the estimate of the region of interest is. In other words, the accuracy value may be data regarding the reliability of the estimate or, conversely, data regarding the uncertainty of the estimate.

The accuracy value may be determined, for example, based on factors including an operational state of a sensor obtaining data such as when the sensor was last calibrated or due to be replaced. For example, if a vehicle knows its LIDAR sensor requires imminent repair or maintenance, any sensor data received prior to the repair or maintenance of the LIDAR may be associated with a lower accuracy value due to the needed maintenance. In other examples, the accuracy value may be determined based on numerous factors such as a distance from which the sensor data is obtained, as well as the conditions of the environment at the time the sensor data is obtained. In further examples, the accuracy value may be determined based on the strength of the signal used to compute the estimate relative to the other data received by the sensor. For example, when detecting a lane marker a vehicle may estimate how strong/bright the detected lane marker signals were relative to other returns from, for example, the laser/camera (i.e., the vehicle may determine how clear/unambiguous the signal was). In yet further examples, for estimates that may incorporate multiple pieces of information (e.g., estimating a lane from where other vehicles are driving) a vehicle may determine the accuracy value based on many pieces of information (e.g., how many other vehicles we observed) and how consistent the pieces of information were (e.g. how similar the paths of other vehicles were).

Other factors may influence the determination of the accuracy value as well. The accuracy value may be represented by any information or data that may help evaluate the estimate of the region of interest. Such representation may include a number or a percentage to name a few, however, other values that indicate accuracy (or confidence) may be used.

The estimate of the region of interest may include any data format capable of organizing and storing information that represents the region of interest, may encompass various types of data, may be of various file formats, and may be stored to various mediums, whether those types of data, file formats, and mediums are known or have yet to be developed. The data may be received in formats compatible with the various sensors (noted above) and computer systems that may be used by a vehicle. Various sources of information may be included in the data such as prior maps of the region of interest, detected objects or lane markers/reflectors in the region of interest, the location or presence of other vehicles in the region of interest, and/or any obstacles that may be present in the region of interest (e.g., k-rails or cones). For instance, the data used to estimate the region of interest may include image data indicative of a digital photograph or a digital graphic that is indicative of the region of interest. Other examples are possible.

To obtain sensor data of the region of interest, the vehicle may, for example, determine a location of the region of interest, and obtain the data based on the location. For example, knowing where a road is in relation to itself and where the vehicle is traveling in the environment, when the region of interest is a particular portion of the road, the vehicle may cause the sensors obtaining data from the road based on the known information. For instance, the vehicle may know that a road is directly in front of it for at least 2 feet before being obstructed (e.g., by the presence of obstacles such as cones). Accordingly, to obtain the desired sensor data, the vehicle may operate one or more sensors to obtain data indicative of the region of interest within the constraints of the known information. In other words, the vehicle may operate a sensor to ensure it obtains sensor data within the 2 feet constraint thereby ensuring sensor data of the region of interest is obtained.

An autonomous vehicle may utilize a large number of scans or periodic scans using various sensors when obtaining the sensor data. Successive scans may be multiple scans by various sensors occurring over time and may be continuous or may occur in intervals. Other examples of successive scans may exist as well.

Block 304 includes receiving second data indicative of the region of interest in the environment. Similar to the first data described above, the second data may include an accuracy value and an estimate of the region of interest. The second data may be received similar to or in the same manner as the first data discussed above, and the accuracy value and the estimate of the region of interest may be obtained in the same or similar fashion as that of the first data described above with regard to block 302.

In some examples, the first data and second data may be obtained by a vehicle using the same sensor, and consequently the first data and second data may be a similar form. However, in other examples, the first data and second data may be obtained using different sensors and, therefore, may differ in form.

Once the data indicative of the region of interest has been received (the first data and the second data), at block 306 method 300 includes based on the first estimate of the region of interest, the first accuracy value, the second estimate of the region of interest, and the second accuracy value, combining the first estimate to the region of interest and the second estimate of the region of interest to determine a combined estimate of the region of interest.

Combining the estimates of the region of interest may include combining the estimates based on weights associated with the accuracy values. For example, if the accuracy value for a certain estimate is small, thereby indicating a large level of uncertainty and a lower confidence level, then that estimate may be given less weight when determining the combined estimate. Alternatively, if the accuracy value for a certain estimate is large, thereby indicating a small level of uncertainty and higher confidence level, then that estimate may be given more weight when determining the combined estimate.

In other examples, instead of using a weight based system to determine the combined estimate, the combined estimate may be determined based only on estimates that are within a certain accuracy range. For example, if the accuracy value for a given estimate is below ten percent then the estimate may be discarded and a new or alternative estimate may be determined. In other examples, estimates that have respective accuracy values within a certain range may be discarded and the combined estimate may be determined based on the remaining estimates. Other manners may be used to combine the estimates.

Note, the percentages used above are examples only and such use is not intended to be limiting. In practice, a different percentage may be used or represented differently (e.g., with an integer instead of a percentage).

The combined estimate of the region of interest may also include an accuracy value that is representative of how accurately the combined estimate of the region of interest represents the region of interest. In circumstances in which the weighted system is used, the accuracy representative of the combined estimate may be a value that may be determined based on the weights of respective accuracy values of the data obtained in block 302 and 304 in the same or a similar manner as described above.

In some examples, after the combined estimate has been determined, the vehicle may be provided with instructions to control the vehicle in the autonomous mode. For example, once the vehicle has estimated the region of interest, instructions may be provided to the vehicle to operate in the region in a particular manner. For example, in scenarios in which the region of interest is a lane of travel, the vehicle may be provided instructions that may successfully allow the vehicle to travel in the lane.

In other examples, the instruction may be provided to a vehicle based on the accuracy value associated with the combined estimate. For example, if the accuracy value associated with the combined estimate is smaller than a threshold level, thereby indicating a large level of uncertainty, the vehicle may be provided instructions to stop operating due to the high uncertainty of what the region of interest includes. Other instructions may be provided.

Figure 4:
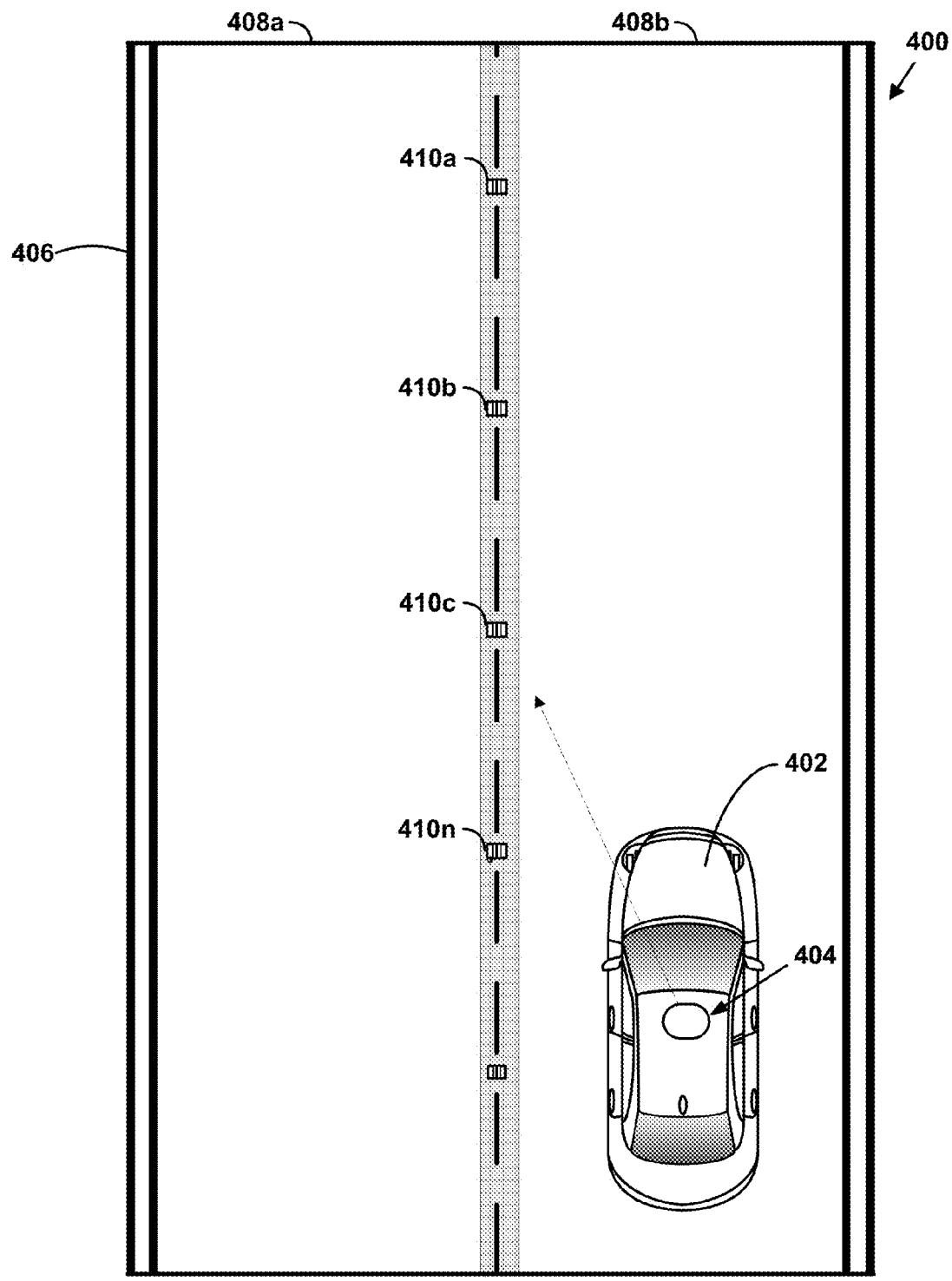
FIG. 4 illustrates an operating scenario, according to an example embodiment.

FIG. 4 illustrates an operating scenario in which an autonomous vehicle may combine multiple estimates of a region of interest in an environment into a consolidated estimate, according to an example embodiment. In FIG. 4, vehicle 402 may be operating in an environment 400. Environment 400 may include, for example, a road 406 that may include lanes 408a and 408b. Lanes 408a and 408b may be separated by lane markers 410a-n. Other objects (not shown) may be included in environment 400 as well.

As vehicle 402 operates in lane of travel 408b in environment 400 it may determine or sense the boundary of lane of travel 408b, which in the scenario depicted in FIG. 4 may be the region of interest (shown in gray). To ensure vehicle 402 accurately determines lane of travel 408b, it may implement method 300 of FIG. 3 described above.

For example, to determine the location of the left boundary of lane 408b, in the example scenario of FIG. 4, vehicle 402 may utilize various sensors (e.g., a LIDAR) of sensor system 404 to determine the location and the presence of lane markers 410a-n that may define the boundary of lane 408b. To do so, using the LIDAR (not shown) and a computer system, vehicle 402 may determine multiple lane estimates for each lane marker 410a-410n which may be represented as a set of two-dimensional (2D) x,y coordinate points that denote the estimated position of each lane marker at various distances down the lane. The lane estimates may be stored in a data storage of vehicle 402 similar to or the same as data storage 114 of FIG. 1.

Along with each estimated position of each lane marker vehicle 402 may also store a set of variances that represent, for each point, the variance in the estimate. The more confident vehicle 402 may be in the particular estimated position, the smaller the variance would be at that point. These (x, y, var) points may define a Gaussian over the possible actual location of the boundary of the lane. Other distributions may be used may be used as well.

Given the collection of different lane estimates, with each estimate having a set of position estimates and a corresponding variance estimate, to determine a combined estimate, vehicle 402 may use a computer system to combine these estimates by treating them as independent estimates of the same quantity (i.e., the true boundary of the lane), and combine them according to their relative variances. For example, for two estimates of lane marker 410a (x1, y1, var1), (x2, y2, var2) vehicle 402 may combine them to produce a resulting consolidated estimate of ((x1*var2+x2*var1)/(var1+var2), (y1*var2+y2*var1)/(var1+var2), var1*var2/(var1+var2)). The result is a robust, principled consolidated estimate from the collection of estimates, as well as a resulting variance in the consolidated estimate. Vehicle 402 may determine consolidated estimates for lane markers 410b-410n as well, thereby estimating the entire left boundary of lane 408b. Performing an estimate in this manner may be a more efficient way to combine several different estimates to determine a consolidated estimate and a representation of the uncertainty/confidence associated with the determined consolidated estimate. As opposed to heuristics or an ordering of the estimates or just using a single estimate, using the techniques described herein may allow us a vehicle to fully utilize all information the vehicle obtains from an environment, along with the quality of the information.

Note while vehicle 402 of FIG. 4 utilizes two-dimensional (2D) points to make estimates, in other examples, vehicle 402 may utilize three-dimensional (3D) points (x, y, z) or 2D points with headings (x, y, theta) to make estimates.

Additionally, while the scenario of FIG. 4 discloses combining the same type of sensor data (multiple lane estimates of a single lane marker), in other examples, multiple types of sensor data may be combined. For example, vehicle 402 may estimate the centerline of lane 408b by detecting lane markers on each side of the lane, combined with an estimate of the centerline based on detecting where other vehicles are driving, combined with an estimate of the centerline based on a prior map estimate of the centerline. Other examples are possible as well.

Example methods, such as method 300 of FIG. 3 may be carried out in whole or in part by the vehicle and its subsystems. Accordingly, example methods could be described by way of example herein as being implemented by the vehicle. However, it should be understood that an example method may be implemented in whole or in part by other computing devices. For example, an example method may be implemented in whole or in part by a server system, which receives data from a device such as those associated with the vehicle. Other examples of computing devices or combinations of computing devices that can implement an example method are possible.

Figure 5:
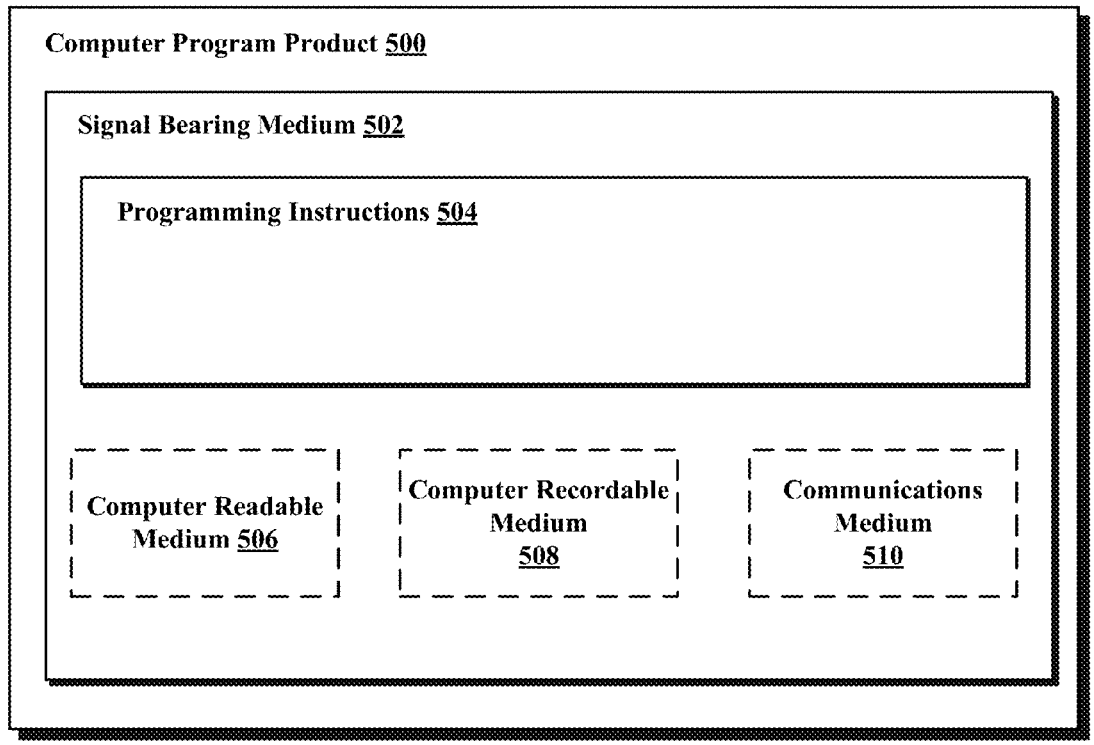
FIG. 5 illustrates a schematic diagram of a computer program product, according to an example embodiment.

In some embodiments, the techniques disclosed herein may be implemented as computer program instructions encoded on a non-transitory computer-readable storage media in a machine-readable format, or on other non-transitory media or articles of manufacture (e.g., the instructions 115 stored on the data storage 114 of the computer system 112 of the vehicle 100). FIG. 5 is a schematic illustrating a conceptual partial view of an example computer program product that includes a computer program for executing a computer process on a computing device, arranged according to at least some embodiments presented herein.

In one embodiment, the example computer program product 500 is provided using a signal bearing medium 502. The signal bearing medium 502 may include one or more programming instructions 504 that, when executed by one or more processors may provide functionality or portions of the functionality described herein. In some examples, the signal bearing medium 502 can be a non-transitory computer-readable medium 506, such as, but not limited to, a hard disk drive, a Compact Disc (CD), a Digital Video Disk (DVD), a digital tape, memory, etc. In some implementations, the signal bearing medium 502 may encompass a computer recordable medium 508, such as, but not limited to, memory, read/write (R/W) CDs, R/W DVDs, etc. In some implementations, the signal bearing medium 502 may encompass a communications medium 510, such as, but not limited to, a digital and/or an analog communication medium (e.g., a fiber optic cable, a waveguide, a wired communications link, a wireless communication link, etc.). Thus, for example, the signal bearing medium 502 may be conveyed by a wireless form of the communications medium 510.

The one or more programming instructions 504 may be, for example, computer executable and/or logic implemented instructions. In some examples, a computing device such as the computer system 112 of FIG. 1 may be configured to provide various operations, functions, or actions in response to the programming instructions 504 conveyed to the computer system 112 by one or more of the computer readable medium 506, the computer recordable medium 508, and/or the communications medium 510.

The non-transitory computer readable medium could also be distributed among multiple data storage elements, which could be remotely located from each other. The computing device that executes some or all of the stored instructions could be a vehicle, such as the example vehicle 200 illustrated in FIG. 2. Alternatively, the computing device that executes some or all of the stored instructions could be another computing device, such as a server.

The above detailed description describes various features and functions of the disclosed systems, devices, and methods with reference to the accompanying figures. While various aspects and embodiments have been disclosed herein, other aspects and embodiments are possible. The various aspects and embodiments disclosed herein are for purposes of illustration and are not intended to be limiting, with the true scope being indicated by the following claims.

We claim:

1. A method comprising:
receiving, using a processor, first data indicative of a lane of travel in an environment from at least one sensor of a vehicle that is substantially in the lane of travel, the first data having been acquired by the at least one sensor at a first time, wherein the first data comprises a first accuracy value and a first estimate of a location of a boundary of the lane of travel, wherein the first estimate comprises a first plurality of coordinate points corresponding to the location of the boundary, wherein the first accuracy value is representative of how accurately the first plurality of coordinate points corresponds to the location of the boundary, and wherein the vehicle is configured to operate in an autonomous mode in the environment;
receiving second data that is different from the first data and indicative of the lane of travel, the second data having been acquired by the at least one sensor at a second time different from the first time, wherein the second data comprises a second accuracy value and a second estimate of the location of the boundary of the lane of travel, wherein the second estimate comprises a second plurality of coordinate points corresponding to the location of the boundary, and wherein the second accuracy value is representative of how accurately the second plurality of coordinate points corresponds to the location of the boundary; and
based on the first data and the second data, combining the first estimate and the second estimate to determine third data comprising a third accuracy value and further comprising a combined estimate of the location of the boundary of the lane of travel, wherein the combined estimate comprises a third plurality of coordinate points corresponding to the location of the boundary, and wherein the third accuracy value is representative of how accurately the third plurality of coordinate points corresponds to the location of the boundary.

2. The method of claim 1, further comprising based on the third accuracy value, providing instructions to control the autonomous vehicle in the lane of travel.

3. The method of claim 1,
wherein the first accuracy value is determined further based on one or more of (i) an operational state of the at least one sensor, (ii) a distance between the first plurality of coordinate points and the at least one sensor, and (iii) first sensor data indicative of environmental conditions present at a time at which the first data was received, and
wherein the second accuracy value is determined further based on one or more of (i) an operational state of the at least one sensor, (ii) a distance between the second plurality of coordinate points and the at least one sensor, and (iii) second sensor data indicative of environmental conditions present at a time at which the second data was received.

4. The method of claim 1,
wherein the first estimate of the location of the boundary of the lane of travel comprises a first image portion, and
wherein the second estimate of the location of the boundary of the lane of travel comprises a second image portion.

5. The method of claim 1,
wherein the first plurality of coordinate points is a first plurality of two-dimensional (2D) coordinate points,
wherein the second plurality of coordinate points is a second plurality of 2D coordinate points,
wherein a given coordinate point of the first plurality of 2D coordinate points is associated with a respective first variance value that indicates how accurately the given coordinate point corresponds to the location of the boundary, and
wherein a given coordinate point of the second plurality of 2D coordinate points is associated with a respective second variance value that indicates how accurately the given coordinate point corresponds to the location of the boundary.

6. The method of claim 5,
wherein the third plurality of coordinate points is a third plurality of two-dimensional (2D) coordinate points, and
wherein a given coordinate point of the third plurality of 2D coordinate points is associated with a respective third variance value that indicates how accurately the given coordinate point corresponds to the location of the boundary.

7. A vehicle comprising:
a sensor configured to sense a lane of travel in an environment of the vehicle, wherein the vehicle is configured to operate in an autonomous mode in the environment, and wherein the vehicle is substantially in the lane of travel in the environment; and
a computer system, wherein the computer system is configured to:
receive first data indicative of the lane of travel in the environment from the sensor, the first data having been acquired by the sensor at a first time, wherein the first data comprises a first accuracy value and a first estimate of a location of a boundary of the lane of travel, wherein the first estimate comprises a first plurality of coordinate points corresponding to the location of the boundary, and wherein the first accuracy value is representative of how accurately the first plurality of coordinate points corresponds to the location of the boundary;
receive second data that is different from the first data and indicative of the lane of travel, the second data having been acquired by the sensor at a second time different from the first time, wherein the second data comprises a second accuracy value and a second estimate of the location of the boundary of the lane of travel, wherein the second estimate comprises a second plurality of coordinate points corresponding to the location of the boundary, and wherein the second accuracy value is representative of how accurately the second plurality of coordinate points corresponds to the location of the boundary; and
based on the first data and the second data, combine the first estimate and the second estimate to determine third data comprising a third accuracy value and further comprising a combined estimate of the location of the boundary of the lane of travel, wherein the combined estimate comprises a third plurality of coordinate points corresponding to the location of the boundary, and wherein the third accuracy value is representative of how accurately the third plurality of coordinate points corresponds to the location of the boundary.

8. The vehicle of claim 7, wherein the computer system is further configured to provide instructions to control the autonomous vehicle in the lane of travel.

9. The vehicle of claim 7, wherein the sensor is a first sensor, wherein the second data is received from a second sensor of the vehicle, wherein the second sensor is different than the first sensor.

10. The vehicle of claim 7,
wherein the first estimate of the location of the boundary of the lane of travel comprises a first image portion, and
wherein the second estimate of the location of the boundary of the lane of travel comprises a second image portion.

11. The vehicle of claim 7,
wherein the first plurality of coordinate points is a first plurality of two-dimensional (2D) coordinate points,
wherein the second plurality of coordinate points is a second plurality of 2D coordinate points,
wherein a given coordinate point of the first plurality of 2D coordinate points is associated with a respective first variance value that indicates how accurately the given coordinate point corresponds to the location of the boundary, and
wherein a given coordinate point of the second plurality of 2D coordinate points is associated with a respective second variance value that indicates how accurately the given coordinate point corresponds to the location of the boundary.

12. The vehicle of claim 11,
wherein the third plurality of coordinate points is a third plurality of two-dimensional (2D) coordinate points, and
wherein a given coordinate point of the third plurality of 2D coordinate points is associated with a respective third variance value that indicates how accurately the given coordinate point corresponds to the location of the boundary.

13. A non-transitory computer readable medium having stored therein instructions that when executed by a computer system in a vehicle cause the computer system to perform functions comprising:
receiving first data indicative of a lane of travel in an environment from at least one sensor of the vehicle, the first data having been acquired by the at least one sensor at a first time, wherein the first data comprises a first accuracy value and a first estimate of a location of a boundary of the lane of travel, wherein the first estimate comprises a first plurality of coordinate points corresponding to the location of the boundary, wherein the first accuracy value is representative of how accurately the first plurality of coordinate points corresponds to the location of the boundary, wherein the vehicle is configured to operate in an autonomous mode in the environment, and wherein the vehicle is substantially in the lane of travel;

receiving second data that is different from the first data and indicative of the lane of travel, the second data having been acquired by the at least one sensor at a second time different from the first time, wherein the second data comprises a second accuracy value and a second estimate of the location of the boundary of the lane of travel, wherein the second estimate comprises a second plurality of coordinate points corresponding to the location of the boundary, and wherein the second accuracy value is representative of how accurately the second plurality of coordinate points corresponds to the location of the boundary; and based on the first data and the second data, combining the first estimate and the second estimate to determine third data comprising a third accuracy value and further comprising a combined estimate of the location of the boundary of the lane of travel, wherein the combined estimate comprises a third plurality of coordinate points corresponding to the location of the boundary, and wherein the third accuracy value is representative of how accurately the third plurality of coordinate points corresponds to the location of the boundary.

14. The non-transitory computer readable medium of claim 13, wherein the instructions are further executable by the computer system in the vehicle to cause the computer system to perform functions comprising:

based on the third accuracy value, providing instructions to control the autonomous vehicle in the lane of travel.

15. The non-transitory computer readable medium of claim 13, wherein the at least one sensor is at least one first sensor, wherein the second data is received from at least one second sensor of the vehicle, wherein the at least one second sensor is different than the at least one first sensor.

16. The non-transitory computer readable medium of claim 13, wherein the first plurality of coordinate points is a first plurality of two-dimensional (2D) coordinate points, wherein the second plurality of coordinate points is a second plurality of 2D coordinate points, wherein a given coordinate point of the first plurality of 2D coordinate points is associated with a respective first variance value that indicates how accurately the given coordinate point corresponds to the location of the boundary, and wherein a given coordinate point of the second plurality of 2D coordinate points is associated with a respective second variance value that indicates how accurately the given coordinate point corresponds to the location of the boundary.

17. The non-transitory computer readable medium of claim 16, wherein the third plurality of coordinate points is a third plurality of two-dimensional (2D) coordinate points, and wherein a given coordinate point of the third plurality of 2D coordinate points is associated with a respective third variance value that indicates how accurately the given coordinate point corresponds to the location of the boundary.

* * * * *